United States Patent [19]

Kelleher et al.

[11] Patent Number: 4,953,101

[45] Date of Patent: Aug. 28, 1990

[54] SOFTWARE CONFIGURABLE MEMORY ARCHITECTURE FOR DATA PROCESSING SYSTEM HAVING GRAPHICS CAPABILITY

[75] Inventors: Brian Kelleher, Mountain View; Thomas C. Furlong, Half Moon Bay, both of Calif.

[73] Assignee: Digital Equipment Corporation, Maynard, Mass.

[21] Appl. No.: 124,897

[22] Filed: Nov. 24, 1987

[51] Int. Cl.[5] .............................................. G06F 15/62

[52] U.S. Cl. .................................... 364/518; 364/900; 364/927.4; 364/964; 364/966.4; 364/957; 364/957.5

[58] Field of Search ........ 364/518, 521, 200 MS File, 364/900 MS File; 340/799

[56] References Cited

U.S. PATENT DOCUMENTS

| | | | |
|---|---|---|---|
| 3,328,768 | 6/1967 | Andahl et al. | 364/200 |
| 4,150,364 | 4/1979 | Baltzer | 364/900 X |
| 4,432,067 | 2/1984 | Niesen | 364/900 |
| 4,701,864 | 10/1987 | Takashima et al. | 364/518 X |
| 4,773,044 | 9/1988 | Sfarti et al. | 364/518 X |

OTHER PUBLICATIONS

Fuchs and Poulton "A VLSI-Oriented Design for a Raster Graphics Engine." *Lambda* 2(3):20-28, 1981.

*Primary Examiner*—Gary V. Harkcom
*Assistant Examiner*—Mark K. Zimmerman
*Attorney, Agent, or Firm*—Flehr, Hohbach, Test, Albritton & Herbert

[57] ABSTRACT

A graphics data processing system memory is allocatable by software between system memory and graphics framebuffer storage. The memory comprises two-port elements connected in parallel from the RAM port to a controller connected to a bus, and having serial output ports connected to output circuitry to map the storage to a display. Corresponding locations, relative to element origin, in all elements are addressed in parallel as an array. Three modes of memory transactions are all accomplished as array accesses. First, a processor reads/writes the system memory portion by a combination of parallel array access and transfers between controller and bus in successive bus cycles. Second, the controller executes atomic graphics operations on the framebuffer storage using successive array accesses; third, the processor can read/write a framebuffer pixel, by an array access of framebuffer storage with masking of unaddressed pixels. An interface arbitrates among requests for memory access.

3 Claims, 9 Drawing Sheets

C

D

E

SOFTWARE CONFIGURABLE MEMORY ARCHITECTURE FOR DATA PROCESSING SYSTEM HAVING GRAPHICS CAPABILITY

This invention relates to data processing systems with graphics capability, and in particular to a memory architecture for such a data processing system.

BACKGROUND OF THE INVENTION

In a data processing system with graphics capability, a system processor executing a graphics application program outputs signals representing matter to be displayed; this representation is generally abstract and concise in form. Such form is not suitable for the direct control of a display monitor; it is necessary to transform the relatively abstract representation into a representation which can be used to control the display. Such transformation is referred to as graphics rendering; in a system using a raster display monitor, the information comprising the transformed representation is referred to as a framebuffer.

The framebuffer representation must be frequently updated, by rewriting its contents in part or completely, either to reflect dynamic aspects of the display, or to provide for the display of images generated from a different application program. Each updating operation requires access to the memory in which a physical representation of the framebuffer is stored; generally a large number of locations in the framebuffer storage must be accessed for each updating operation. The speed of rendering the display is limited by the requirement for graphics memory access; the greater the number of bits in the graphics memory (framebuffer storage) that can be read or written in a given time period (the "memory bandwidth"), the better the graphics performance. Use of two-port video RAMs has permitted the update accesses to go forward independently of the refresh accesses, easing the update bandwidth requirement somewhat, but this aspect of the graphics operation remains a major problem in achieving real time dynamic displays.

Graphics memory bandwidth depends on the number of memory packages (chips) comprising the graphics memory, multiplied by the number of i/o pins per package; the product is the maximum possible number of bits that can be accessed in one memory transaction. Bandwidth is then a function of this maximum number and of the time required for a memory transaction.

From the point of view of obtaining large bandwidth, it is therefore desirable to use a relatively large number of i/o pins. However, recent developments in memory chip design have resulted in increasing numbers of bits per chip (referred to as "higher density"), while the number of i/o pins per chip has remained relatively constant. Higher density chips tend to be less expensive elements than lower density chips; further, designs using higher density chips can allocate less board space to memory chips than would be required by a design using lower density chips, a further element in achieving an economical overall design. Such high-density chips are therefore desirable design choices; but when such chips are used, there are fewer i/o pins per bit than there are when low density chips are used. This results in reduced memory i/o bandwidth, which degrades the graphics performance.

If, in order to obtain sufficient bandwidth, more chips are used than are in fact needed to store the framebuffer information, some of the memory is in effect wasted, which increases the cost of a system of such design.

It would therefore be desirable to provide a memory architecture which provides a large graphics memory bandwidth, while at the same time making efficient use of all the memory elements which comprise the memory.

If such increased memory bandwidth is to improve the graphics performance, it must be provided in a form which can be efficiently used. Many conventional graphics rendereing operations are carried out by a series of steps that are highly incremental in nature; that is, the value of a particular framebuffer pixel cannot be updated (and the framebuffer storage rewritten) until the updated value of an adjacent framebuffer pixel is known. Framebuffer updating carried out by means of such incremental operations requires frequent memory transactions, each involving a relatively small number of bits. The rendering performance of such a graphics system can be improved by decreasing the time required for a memory transaction, but will not be much improved by increasing the number of bits which can be addressed in a transaction.

It is therefore desirable to provide a graphics architecture which permits efficient use of the improved memory bandwidth.

It is an object of the present invention to provide a memory architecture for a data processing system with graphics capability which provides greatly increased graphics memory bandwidth, suitable for use in a highly parallel graphics rendering subsystem. It is a further object to provide such an architecture that is relatively economical to realize and is therefore suitable for use in low end systems. Additionally, it is an object to provide such an architecture that permits the entire memory capacity to be used by the system, by allocating the memory between graphics memory and system memory. It is yet another object to provide such an architecture that permits flexible (software configurable) allocation of the memory according to needs of a particular application and particular system configuration.

BRIEF DESCRIPTION OF THE INVENTION

For use in a data processing system having a processor and a processor bus, a memory module according to the invention has an interface for connection to the processor bus, and a module bus connected to the interface. The module further has K memory elements, each providing an equal plurality of storage locations addressable relative to element origin; each memory element has a serial output port and a random access port, the serial output port being connected to output circuitry for connection to a display.

The module has addressing means for providing one location address relative to element origin in parallel to every memory element, for concurrently addressing corresponding storage locations in every memory element. The corresponding locations comprise an addressed location array.

A controller is connected to the module bus; the random access port of each memory element is connected to the controller in parallel with each other memory element for a parallel memory transfer of signals between the controller and the addressed array locations. The addressing means is responsive to a processor address signal of a first kind for providing address signals specifying a location array in a first set of contiguous memory element locations, and is responsive to a processor address signal of a second kind for providing address signals specifying a location array in a second set of contiguous memory element locations.

In preferred embodiments, processor address signals of the first kind address system memory space; the first set of locations comprises storage for system memory. In a processor system memory write operation, processor write data word signals provided in sequential module bus cycles are multiplexed to the controller and are written in parallel to addressed array locations in system memory. In a processor system memory read operation, data words signals are read in parallel from addressed array locations in system memory and are multiplexed in sequential module bus cycles to the module bus for transfer to the processor.

The second set of contiguous locations comprises graphics framebuffer storage for storing the pixels (x,y) of a X×Y framebuffer. The connections between the memory element serial output ports and the output circuitry map the locations to the framebuffer. The framebuffer storage is addressable as a plurality of framebuffer pixel update arrays, each array having a determined origin with respect to the framebuffer, and each location being addressable by an offset with respect to the array origin. The update array comprises W×H framebuffer pixels, concurrently updatable in a parallel memory transaction; the set of update arrays tiles the framebuffer. The processor can directly address a pixel in the framebuffer with an i/o space address; the module addressing means responds by providing location address signals specifying array origin, and mask information signals specifying offset within the specified array. The controller is responsive to the mask information signals to select from the transferred update array signals, pixel signals specified by the processor address signal, or to write processor data signals to the location specified by the processor address signal. The interface arbitrates among processor system memory operation requests and controller atomic graphics operations.

The partition between system memory and framebuffer storage is specified by a parameter stored in writable storage in the processor.

According to another aspect of the invention, multiple arrays of memory elements are supported by multiple controllers, to provide update arrays of dimensions greater than the dimensions of the memory element array, or to provide pixel depth greater than the number of bits stored at an addressed location in a memory element. Other objects, features and advantages will appear from the following description of a preferred embodiment, together with the drawing, in which:

DETAILED DESCRIPTION OF THE INVENTION

Figure 1:
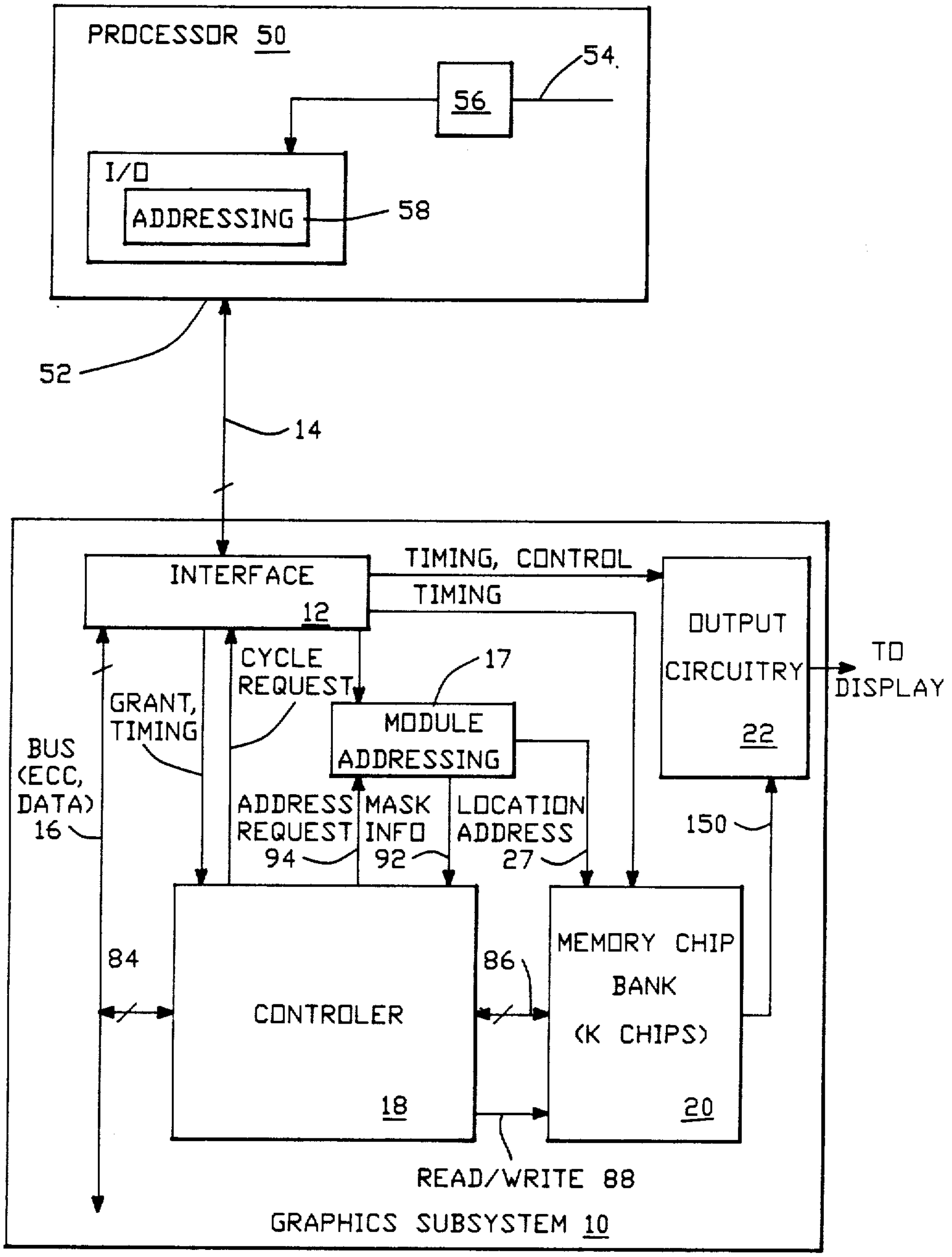
FIG. 1 is a block diagram of a data processing system in which the invention is employed.

Referring now to the drawing, and in particular to FIG. 1, a graphics subsystem 10 (memory module) is connected by processor bus 14 to port 52 of a processor 50. Bus 14 is adapted to carry signals (specifying data or address) between processor 50 and subsystem 10, and is connected to subsystem 10 through a bus interface 12. A subsystem data bus 16 (module bus) is connected to interface 12. Graphics subsystem 10 provides a memory comprising a bank 20 of K conventional two-port video RAM chips desirably arranged in an array $A \times B = K$. Each chip (memory element) provides an equal plurality of storage locations, each location being addressable relative to the chip origin. The random access ports of the chips of bank 20 are connected through a controller 18 to subsystem bus 16. The serial output ports of the chips of bank 20 are connected at 150 to graphics output circuitry 22, which is of conventional design and will not be described; signals output from circuitry 22 are connected to a conventional raster color display monitor, not shown. Additional banks of video RAM chips may be provided, as will be described.

Processor 50 executes a graphics application program, details of which are not pertinent to the present invention, but which results in the specification of matter to be displayed. The images to be displayed are specified by processor 50 in a relatively abstract and concise form, which cannot be directly used to control the display monitor. The representation must be converted to a suitable form, which for a raster display monitor is referred to as a framebuffer comprising an ordered array of framebuffer pixels, each corresponding to a display pixel of the display screen. Such conversion is referred to as rendering. In the graphics subsystem of FIG. 1, controller 18 functions to provide accelerated graphics rendering, as will be explained.

Still referring to FIG. 1, interface 12 includes means for performing the usual functions of a bus interface, such as bus monitoring and support, bus protocol, as well as error detection. For the particular function of interfacing between bus 14 and the graphics subsystem 10, interface 12 additionally provides means for arbitration of requests for access to memory bank 20; timing means for controller 18, for output circuitry 22, for memory bank 20, and for the display monitor; and means for controlling subsystem bus 16.

Memory module addressing means 17 translates between processor addresses and memory chip bank addresses, as will be described in more detail after the memory chip bank has been described. Responsive to addresses from processor 50, or to signals from controller 18, addressing means 17 provides location address signals 27 to bank 20, and mask information signals to controller 18. It should be understood that although for clarity of description memory module addressing means is shown in FIG. 1 as separate from interface 12 and controller 18, this arrangement is not significant. The necessary addressing functions may be provided by circuitry otherwise distributed, for example, distributed between interface 12 and controller 18.

The memory provided by memory bank 20 (together with other video RAM banks, if provided) is allocated between storage for the graphics framebuffer, and system memory (storing, for example, programs). This allocation is not hardware dependent, but is accomplished by software. A parameter signal specifying a current memory allocation (that is, the position of the partition between framebuffer storage and system memory), is stored at 56. Storage 56 is writable. The parameter signal may be input at 54, for example, from execution of a program by processor 50 or another processor, or may represent a boot parameter. Processor addressing means 58 generates addresses to system memory (in memory space) with reference to the value stored at 56; that is, the allocation of memory between framebuffer storage and system memory is known to processor 50. In the described embodiment, a 32-bit address is generated by processor 50, of which the value of bit 29 is set or not set, to specify memory space or i/o space addresses. This is an implementation detail; the distinction between addresses to the two address spaces may be made in any convenient way.

Figure 2:
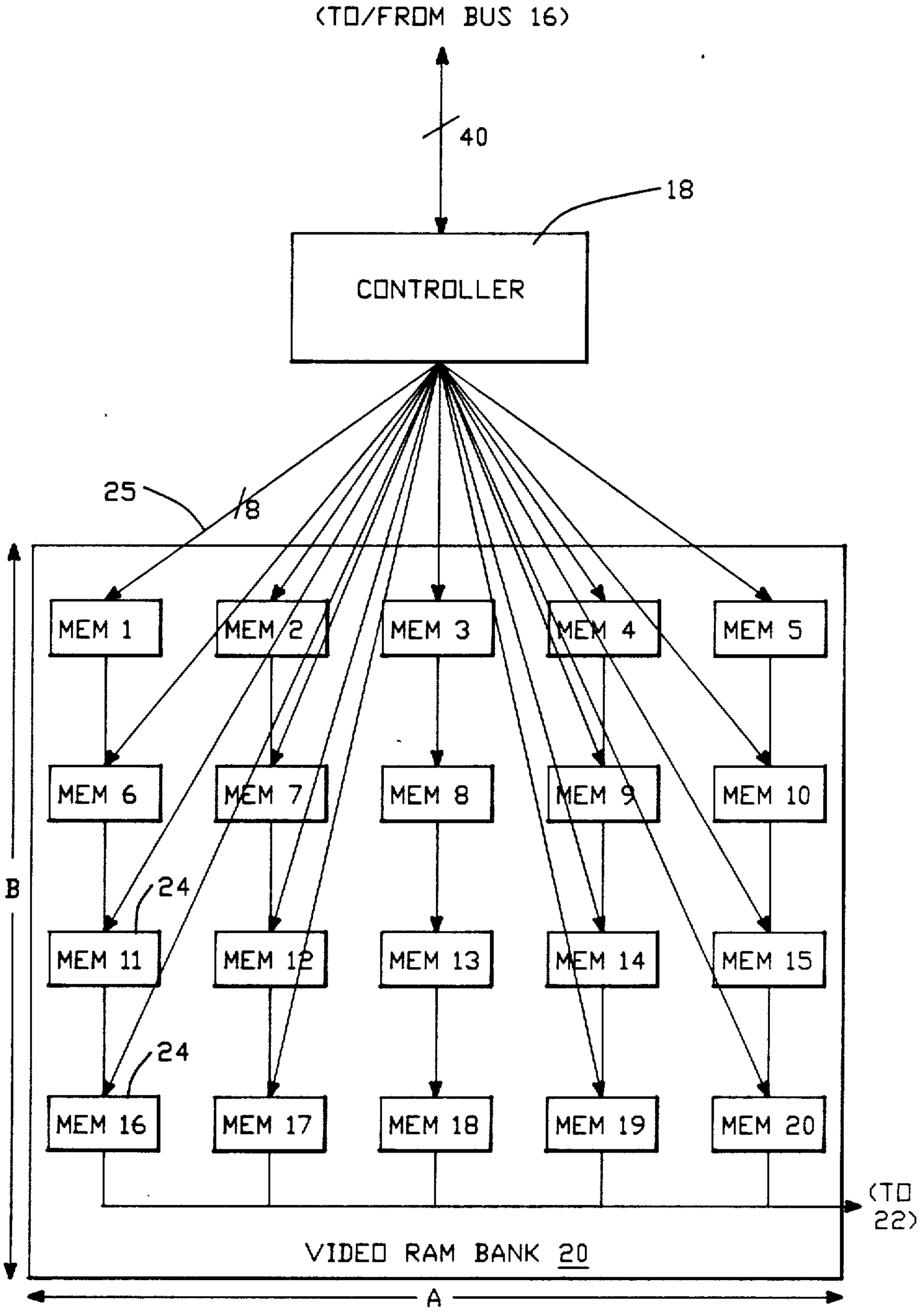
FIG. 2 is a block diagram of the memory bank of the data processing system of FIG. 1.

The video RAM chips of bank 20 are disposed as a $A \times B = K$ chip array, for example, referring now to FIG. 2, in the described embodiment, a $(A=5)\times(B=4)$ array of $K=20$ chips 24, each chip 24 (identified by its chip array position as (a,b)) having an 8-bit parallel i/o path to controller 18. An equivalent implementation would be 40 chips each with a 4-bit parallel io path. Other chip array dimensions may also be employed, for example, $(A=4)\times(B=4)$ with an 8-bit parallel i/o path, or $(A=20)\times(B=1)$. The total number K of memory elements is the critical feature, since K×path width is the factor which affects the bandwidth. Controller 18 has the capability of accessing in parallel (path width)×A×B bits, or for the described embodiment, $(8\times5\times4)=160$ bits. If additional chip banks are employed, each having a similar controller, then multiples of 160 bits can be accessed in parallel by the concurrent operation of the several controllers.

The set of corresponding locations in the K chips (a,b) specified by a location address from module addressing means 17 comprises an addressed location array.

In a system using a raster display, the framebuffer storage (and the corresponding framebuffer, which is conceptual rather than physical) of a graphics subsystem is mapped to the display screen in terms of pixels (picture elements). The raster display screen comprises a rectangular array of X×Y display pixels (x,y). At any particular time, each display pixel displays a color specified by a color value; signals representing the bits of a digital representation of the color value are stored in the framebuffer storage at the (x,y) position of the framebuffer pixel corresponding to the display pixel. The display is refreshed by output circuitry such as circuitry 22 in FIG. 1, which cyclically reads signals from the framebuffer storage, interprets the signals, and controls the display monitor appropriately to display corresponding colors in the display pixels, all in a manner well understood in the art. Changes in the display are made by updating the representations of color values in framebuffer storage; on the next refresh cycle these changes are represented by corresponding changes on the display screen.

Figure 3:
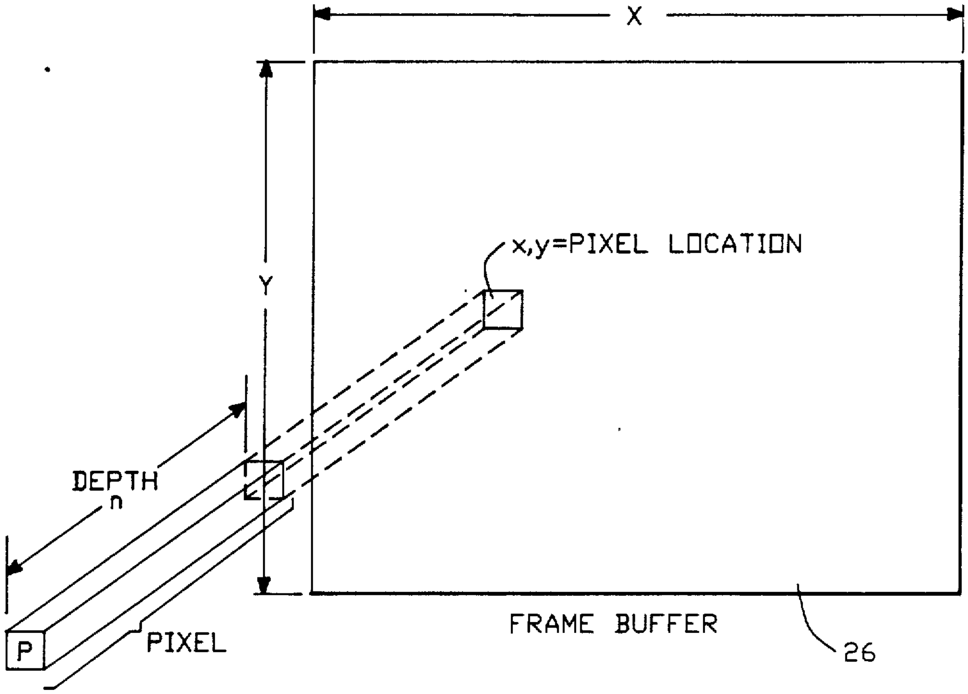
FIG. 3 is a conceptual showing of a framebuffer represented in the memory bank of FIG. 2, and a pixel thereof.

Conceptually, the bits comprising a framebuffer pixel x,y (specifying the color value of the display pixel x,y) are regarded as being all stored at the pixel position in the framebuffer, which is regarded as a three dimensional construct. Referring now to the conceptual showing of FIG. 3, a framebuffer 26 comprises an array, X framebuffer pixels across and Y framebuffer pixels vertically, corresponding to the X×Y display pixels of the display; at the specific framebuffer position (x,y) the framebuffer has n bits comprising a framebuffer pixel. The framebuffer pixel is said to have depth n. The information stored at the frame buffer pixel position may be regarded as divided into buffers, separately addressable. An intensity or I-buffer is always provided, the refresh being conducted from this buffer; additional buffers (of the same size), such as a double buffer or a Z buffer, may be provided, as well understood in the graphics art, for specific graphics applications. While the number of buffers employed may vary with the specific graphics application, and is thus a matter of software design choice, the number of bits in a buffer is a matter of hardware design choice in the particular graphics subsystem, depending on the design of the video output circuitry. If the buffer size is 8 bits, for example, and a single buffer is used, the framebuffer pixel depth n is 8; if two buffers are used, the framebuffer pixel depth n is 16. In other hardware designs, the buffer size can be chosen to be 24 (providing 8 bits each for red, blue and green information); in such a system a two-buffer pixel has a depth n of 48. Other buffer sizes may be provided.

Addressing means 17 and controller 18 control the storage of signals in the A×B video RAM chips 24 of bank 20 in addressed array locations such that representations in the storage of certain adjacent framebuffer pixels can be accessed in parallel through controller 18 responsive to a single location address relative to chip origin, supplied in parallel to all chips from addressing means 17. In particular, the framebuffer pixel signals are so stored that an update array of W×H pixels can be accessed in parallel, the update array being so specified that the entire X×Y framebuffer (and display) can be tiled by a plurality of such W×H update arrays having determined origins. Each update array can be identified by an array origin identifier. The dimensions W, H of the update array need not be equal to the dimensions A, B of the chip array, as will be described, but in the simplest case W=A and H=B.

The connections 150 between the serial output ports of chips 24 and video output circuitry 22 determine the mapping between chips 24 and the display screen; that is, the framebuffer pixels in memory 20, as located by the mapping between controller 18 and chips 24, must be serially accessed in raster order of (x,y) to refresh the display.

Figure 4:
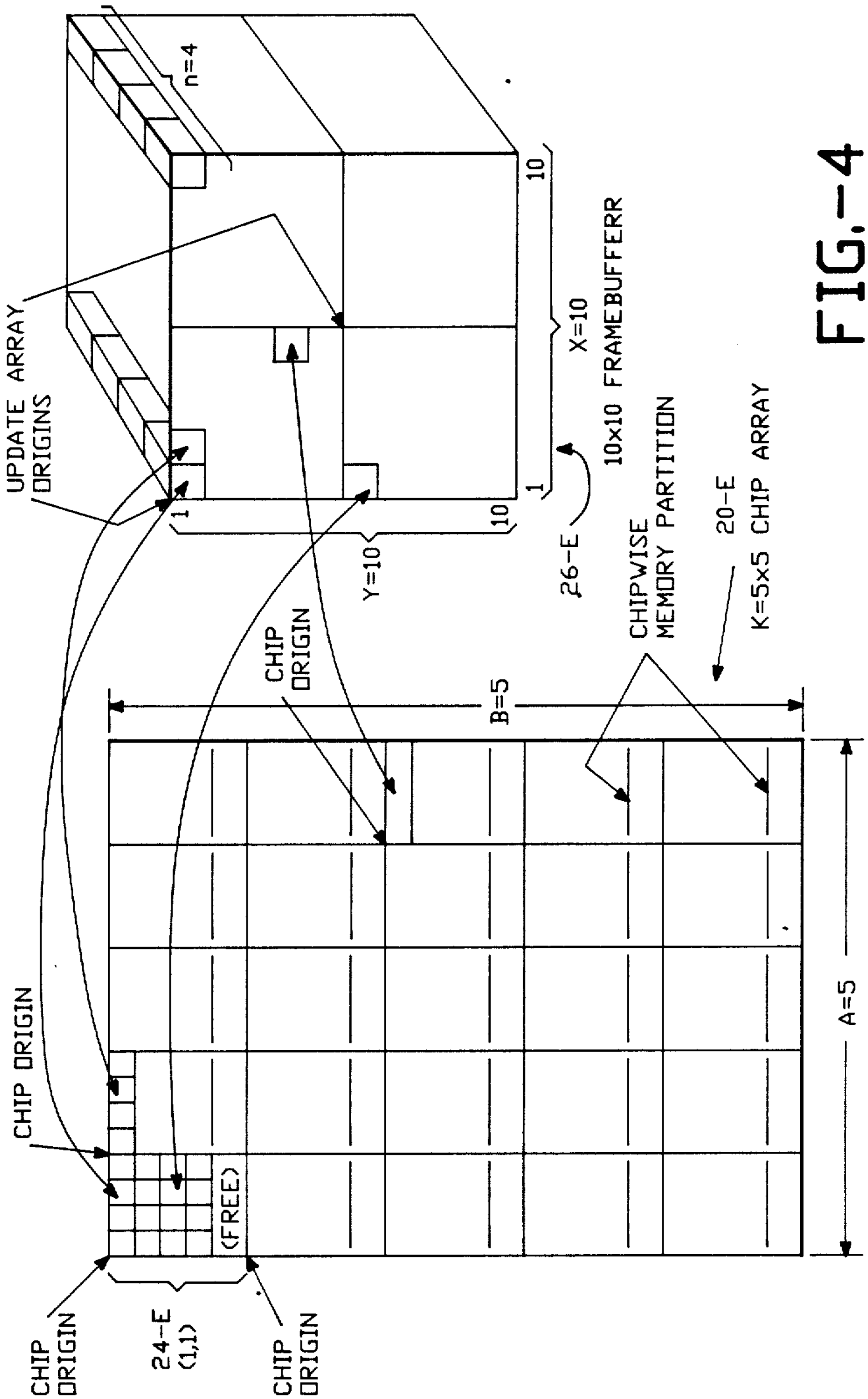
FIG. 4 is an illustrative showing of the mapping between a memory chip bank and a conceptual framebuffer.

Referring now to FIG. 4, by way of illustration the mapping is shown between a conceptual three-dimensional framebuffer and a corresponding physical chip bank laid out on a plane. (The particular numbers employed are not those of a real graphics subsystem but have been chosen to provide a simple illustrative example.) An exemplary framebuffer 26-E has 100 framebuffer pixels (X=10)×(Y=10) as shown, each pixel having an exemplary depth of n=4 bits. The signals representing the framebuffer are stored physically in chip bank 20-E comprising a (A=5)×(B=5) chip array (K=25 chips), controlled by a controller (not shown) to provide 4 bit parallel access from the controller to each chip (a,b) in chip array 20-E. It is assumed that four 4-bit pixels can be stored in each chip without occupying all locations. Thus chip (a=1, b=1) of bank 20-E stores the four bits of pixel (x=1, y=1) in its first location; pixel (x=2, y=1) is stored in the corresponding first location of chip (a=2, b=1). These two pixels are in the first update array, and can be accessed in parallel because they are in different chips in the chip array and are in corresponding locations in the respective chips. However framebuffer pixel (x=1, y=6) is stored in the third location of chip (a=1, b=1) of bank 20-E, so that it cannot be accessed in parallel with pixel (x=1, y=1). It is thus seen that framebuffer 26-E is tiled by four 5×5 update arrays of framebuffer pixels having array origins at (1,1), (6,1), (1,6) and (6,6), and that the signals representing all the framebuffer pixels of an update array, stored in the graphics subsystem memory, will be concurrently accessed in parallel in a single memory transaction, specified by a single location address from addressing means 17. In an actual graphics system of interest, many more than four update arrays are required to tile the display. The framebuffer pixels are stored in a set of contiguous storage locations within chips 24-E.

It will be seen that in the illustrative showing of FIG. 4, the chips of chip array 20-E are not completely filled by the contiguously stored signals representing the pixels of framebuffer 26-E. As shown, 8 contiguous bits are free in each chip. (This number is illustrative only.) The set of contiguous free locations from all chips of the array comprises the portion of the memory bank which is allocatable as system memory.

Figure 5A:
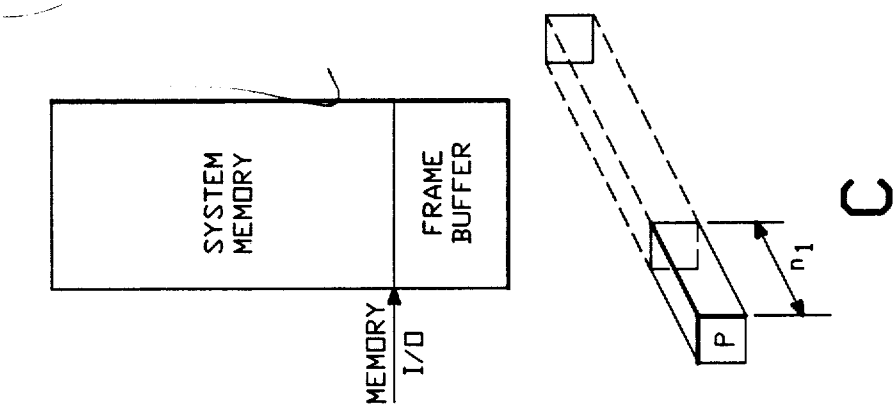
FIG. 5A, 5B and 5C show for three exemplary pixel depths the allocation of memory according to the invention.
Figure 5B:
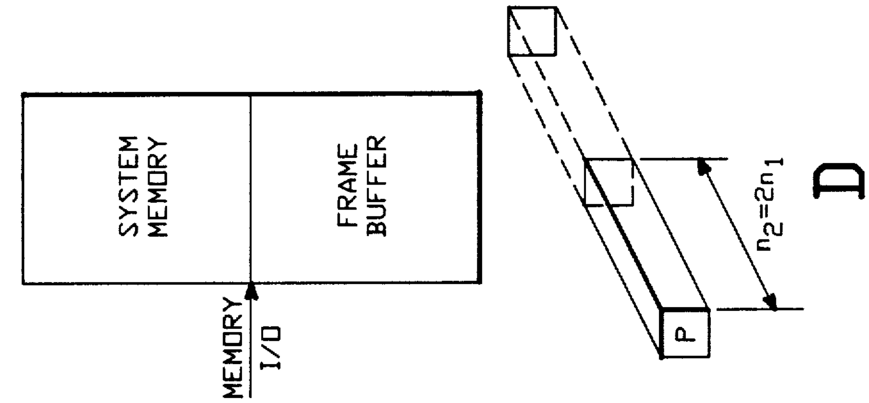
Figure 5C:
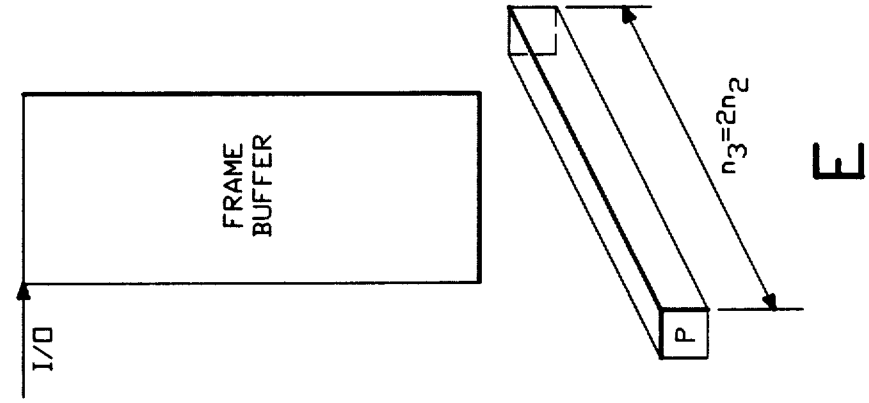

The memory provided by chip bank 20 can be conceptualized as globally divided into two portions, rather than divided chipwise into two portions as seen in FIG. 4. Referring now to FIG. 5, the global partition of the memory of bank 20 for three different configurations C, D and E is shown. (It is assumed that the total memory remains constant, that is, the number of memory chips remains constant.) In configuration C, requiring a framebuffer pixel depth of n1 (for example, only an I buffer of n1 bits) the memory-i/o partition allocates a major portion of the memory to system memory. In configuration D, the framebuffer pixel depth n2 is 2×n1, reflecting for example use of a double buffer in addition to the I buffer; only one half of the memory is allocated to system memory. In configuration E, the entire memory is required for storage of the framebuffer (pixel depth $n3=2\times n2$). For configuration E, additional system memory must be provided on another board. FIG. 5 illustrates the fact that framebuffer pixel depth is an integral multiple of buffer size; correspondingly, the memory provided by chip bank 20 is partitioned on a buffer boundary. The parameter stored in storage means 56 of processor 50 specifies the position of the memory-i/o partition. The parameter stored at 56 can be rewritten, corresponding to a change in the allocation of memory 20; such allocation is therefore software configurable.

Additional banks of memory may be employed in the graphics subsystem, each with its controller. These additional chip arrays and controllers can be configured to support parallel update of overlapping arrays, or to support update arrays larger than each chip array.

Figure 8:
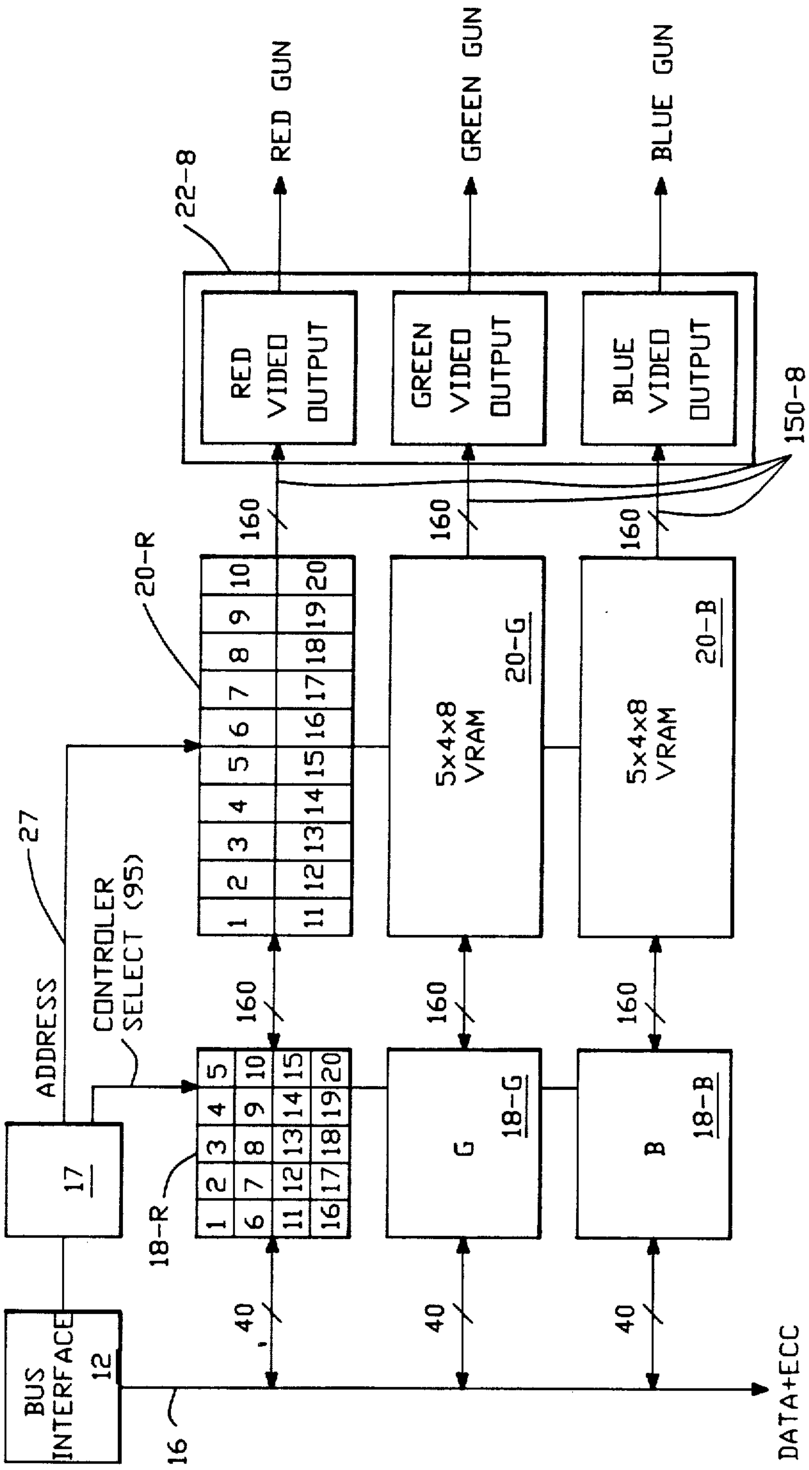
FIG. 8 shows a portion of a graphics subsystem according to the invention, having multiple memory banks and multiple controllers.

An example of overlapping arrays is shown in FIG. 8. Three 5×4 chip arrays are employed, each with a controller: array 20-R stores 8-bit signals for control of the red gun of the display, array 20-G stores 8-bit signals for control of the green gun, and array 20-B stores 8-bit signals for control of the blue gun. The signals stored in 20-R, 20-G, and 20-B together comprise the representation of the framebuffer. The connections 150-8 between the chip arrays and the output circuitry 22-8 are such that the bits stored in corresponding locations in 20-R, 20-B, and 20-G are serially accessed by circuitry 22 for a single pixel address (x,y); circuitry 22-8 is adapted to support a 24-bit pixel. This implementation therefore provides a pixel depth of 24 bits, while the update array dimensions (W=5)×(H=5) are the same as the chip array dimensions (A=5)×(B=5). Each chip bank is controlled by a controller like controller 18 of FIGS. 1 and 9. Arrays 20-R, 20-G and 20-B together comprise the subsystem memory. In this system, it is possible to update 3×160 or 480 bits in parallel in a single memory transaction.

Figure 10:
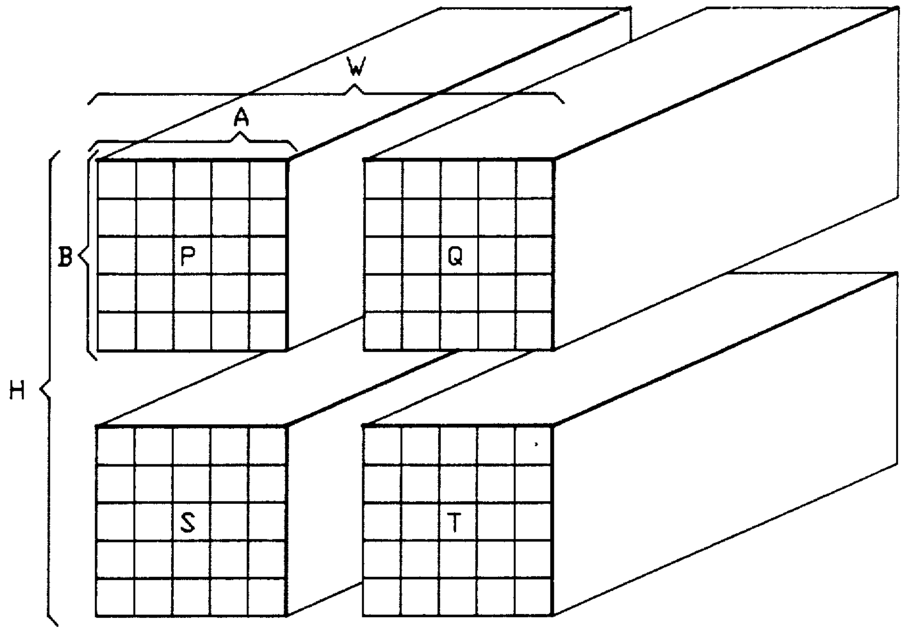
FIGS. 10 and 11 show a particular portion of a framebuffer and a corresponding configuration of the graphics subsystem, according to an additional embodiment of the invention.
Figure 11:
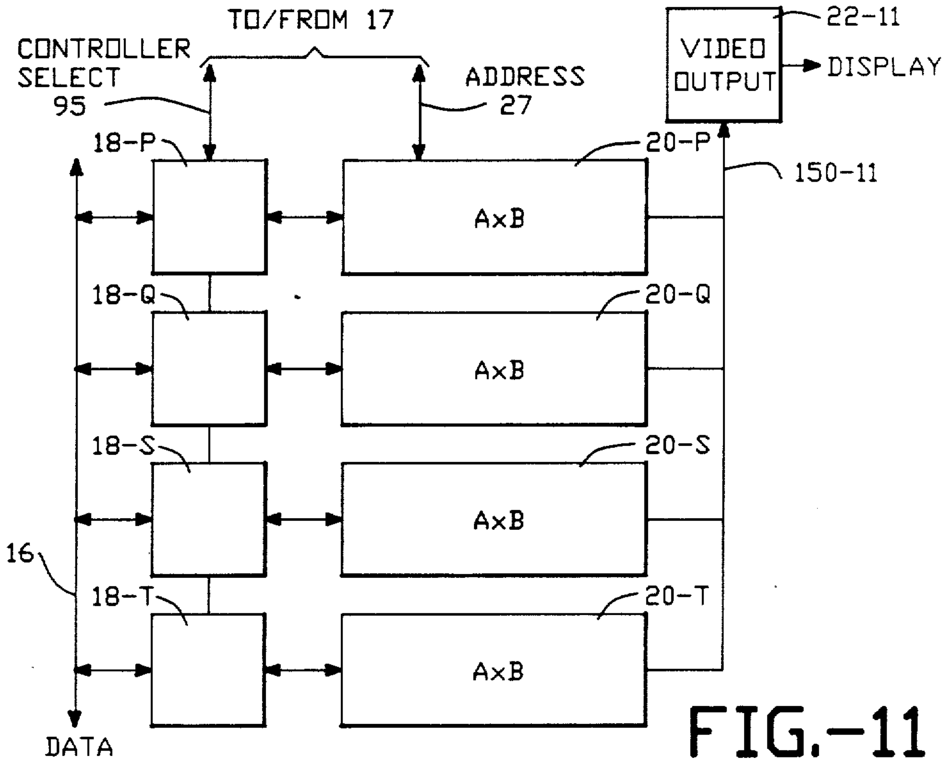

An example in which the update array is larger than the chip array is shown in FIG. 10 and FIG. 11. A framebuffer update array of W×H pixels is shown, where W=2A and H=2B. The update array comprises four regions P, Q, S and T. The corresponding chip arrays and controllers are shown in FIG. 11. Each controller 18-P, 18-Q, 18-S, 18-T controls a bank of A×B chips. The connections 150-11 between chips 20-P, 20-Q, 20-S and 20-T and output circuitry 22-11 are such that the bits stored in corresponding locations in the four chip arrays are serially accessed by circuitry 22-11 as W×H pixels. Thus an update array larger than the chip array size is supported in this embodiment.

Figure 9:
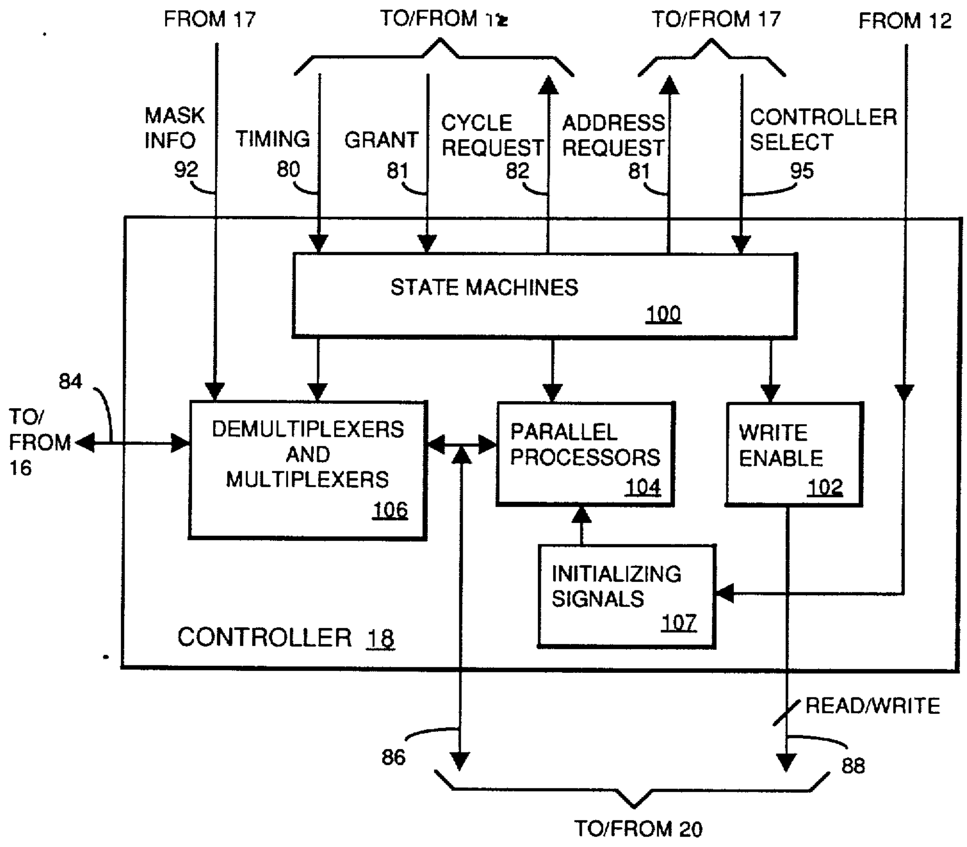
FIG. 9 is a block diagram of a memory controller according to the invention.

Referring to FIG. 9, controller 18 provides state machines 100 for controlling the state of the controller; state machines 100 receive timing signals from interface 12 on lines 80. State machines 100 output a memory cycle REQUEST semaphore on line 82 to interface 12, and receive a GRANT semaphore on 81 from interface 12. Controller 18 further provides read/write enable generating means 102, which outputs to each of chips 24 of bank 20 read/write enable signals on lines 88, responsive to a processor write operation or in the course of a controller graphics operation. In the described embodiment having a (A=5)×(B=4) chip bank 20 with 8-bit parallel paths, data is transmitted on 40-bit parallel path 84 between controller 18 and subsystem bus 16; data is transmitted on 160-bit parallel path 86 between controller 18 and memory bank 20.

For each memory chip of bank 20, controller 18 provides an internal processor for the execution of atomic graphics operations, the processors 104 operating in parallel. Such atomic graphics operations include, for example, writing a geometrical figure to the framebuffer, moving a figure from one part of the framebuffer to another part, drawing a line, and the like. The details of such atomic graphics operations are not pertinent to the present invention. Controller 18 further provides signal multiplexing/demultiplexing means 106 for controlling the transfer of signals between memory bank 20 and subsystem bus 16, and receives from module addressing means 17 mask information signals on 92 for the control of multiplexers 106. Controller 18 provides to module addressing means 17 address request signals on 94, to be described.

In multi-controller embodiments such as that shown in FIG. 11, each controller is initialized with initializing signals specifying the size of the update array (values of W and H) and the position in the update array of the pixels stored in the chip bank managed by the controller. Such initializing signals are stored at 107 (FIG. 9). As described below, all data signals for atomic graphics operations are provided in common to all controllers; each controller interprets the data uniquely with respect to its stored initializing signals. For processor read/write operations, either of system memory or of the framebuffer storage, a controller select signal 95 is output to state machines 100 from module addressing means 17.

Every access to the graphics subsystem memory bank 20 is carried out through controller 18; all memory transactions are carried out as array access transactions. Three modes of memory transaction are provided: processor system memory operation, processor read/write framebuffer operation, and controller atomic graphics operation. Interface 12 arbitrates among requests for these three kinds of access to memory bank 20. System memory (highest priority) and processor read/write framebuffer (next highest priority) operations are induced by processor 50. Atomic graphics transactions, although performed responsive to data transmitted from processor 50, must be requested by controller 18 (cycle request, on line 82). In response to the CYCLE REQUEST semaphore, if no operation having either of the two higher priorities is pending, interface 12 asserts the GRANT signal (on line 81) to controller 18. In the absence of the GRANT signal, the processors 104 of controller 18 are not enabled, so that controller 18 functions only as a multiplexer; when the GRANT signal is provided, the processors 104 of controller 18 are enabled.

A system memory access will be first described. In a system memory operation, processor 50 reads or writes locations in the portion of chip array 20 which is allocated as system memory. In the described embodiment, data which is the subject of system memory transactions is cacheable and must be ECC protected.

To carry out a system memory operation in the described embodiment, processor 50 through its addressing means 58, and with reference to the signal stored at 56, addresses memory space, placing signals representative of the memory space address on bus 14 in a first operating cycle. For a write operation, during each of the next four cycles processor 50 places 32 bits (4 bytes) of write data signals on bus 14, comprising in four cycles a 128-bit "octoword"; for a read operation, no data signals are placed on bus 14 by processor 50.

Interface chip 12 recognizes the address as a memory space address by means of the address bit 29, and gives priority to this operation by deasserting the GRANT signal on 81. Memory module addressing means 17 responds to the processor memory space address signals by providing location address signals which are input to memory bank 20, and (in a multi-controller system like that of FIG. 8 or FIG. 11) a controller select signal 95. The selected controller recognizes the controller select signal; other controllers, if present, are inactive.

Figure 6:
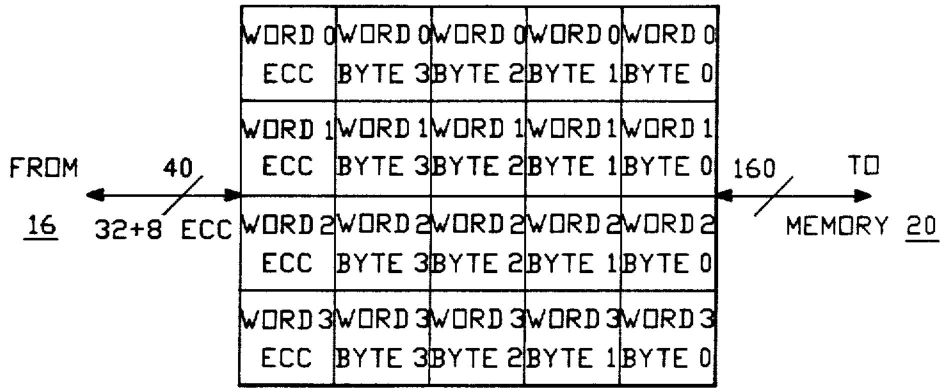
FIG. 6 shows the format of data to be transferred between the subsystem bus and memory of FIG. 1 in a first type of memory transaction, according to the invention.
Figure 7:
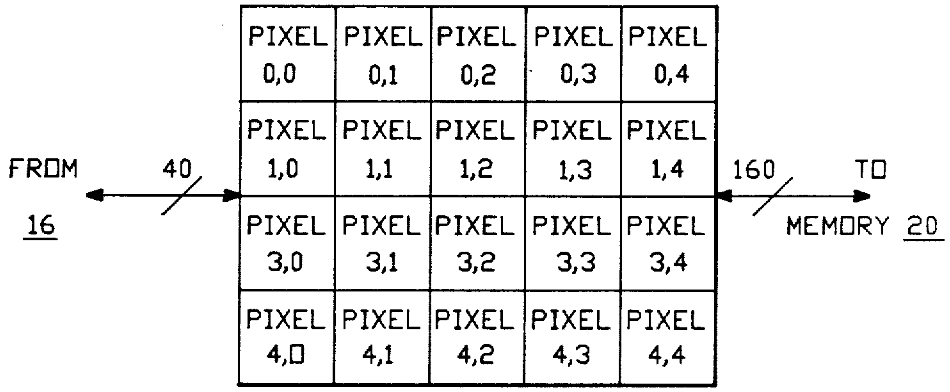
FIG. 7 shows the format of data to be transferred between the memory controller and memory of FIG. 1 in a second type of memory transaction, according to the invention.

In a write operation, in the four cycles after transmission of the memory address from processor 50, the write data signals from processor 50 are received by interface 12. Interface 12 generates ECC (error correction code) data and transmits the data signals in the form of four words, each comprising 8 bits of ECC data and 32 bits of write data (4 bytes), on subsystem bus 16. Multiplexers 106 of the selected controller are controlled by state machines 100 to store the four successively transmitted write data words; write enable signal is provided on 88 to all K chips; the four write words are then in a single operation written by selected controller 18 to the locations in the portion of memory allocated to system memory, specified by the location address from addressing means 17. Referring to FIG. 6, the format of data transferred in this memory transaction is shown schematically. It will be seen that the 4-word unit is stored aligned with the chip array origin.

Words 0, 1, 2, and 3 are transferred in successive cycles to/from bus 16; the four words are transferred in parallel to/from memory 20 in a single transaction. In a read operation, controller 18 reads the four words from memory 20 during a single memory transaction, and then during each of four sequential cycles multiplexes one of the four words onto bus 16 to transmit them in the appropriate order to processor 50. In a write operation, controller 18 receives the four words from bus 16 during four sequential cycles, and thereafter transfers the four words in parallel to memory 20 in a single memory transaction.

Memory operations of the kind described do not appear to processor 50 to be in any way different from references to conventional system memory.

A second mode of memory access is an access required for an "atomic graphics operation" resulting in the update of an array of pixels in the framebuffer. Such memory access has the lowest priority of the three modes. An atomic graphics operation may be, for example, writing a polygon to the framebuffer. Generally, the polygon is tiled by a plurality of update arrays, requiring a corresponding number of memory accesses to complete the writing operation. Such accesses proceed so long as the GRANT semaphore from interface 12 is asserted; if a higher-priority memory transaction is requested by processor 50, the GRANT semaphore is deasserted, interrupting the graphics operation.

To initiate an atomic graphics operation, processor 50 addresses subsystem 10 with an i/o space address, and places data signals on bus 14, specifying operation data such as the x,y positions in the framebuffer of the vertices of a polygon to be drawn. Interface 12 transmits the operation data signals on subsystem bus 16. The controllers (if more than one is employed) all receive the same operation data signals. (In a multiprocessor environment, before the processor can transmit such data signals, it must execute a "controller acquire" operation to ascertain whether the controller is executing an operation for another processor.)

Each controller which supports a chip array into which the polygon is to be written sends the CYCLE REQUEST semaphore to interface 12; if no higher priority operations are pending, interface 12 asserts the GRANT line. Controller 18 identifies the first update array to be accessed in the graphics operation, and issues address request signals to module addressing means 17, which outputs a corresponding location address to chip bank 20. As controlled by state machines 100, the processors 104 of each controller execute the graphics operation in parallel with respect to the operation data; write enable generator means 102 provides an enable signal to chips 24. All pixels in the addressed update array are accessed in parallel; however, not all pixel values may be changed in any particular update operation. Repeated array accesses may be required to complete the operation; in this case controller 18 provides further address request signals to addressing means 17, specifying the next update array to be accessed. Responsive to the address request signal, means 17 provides the next location address signals to memory 20.

It will be seen that this mode of operation makes efficient use of the increased memory bandwidth provided. In a single memory transaction, a relatively large number of bits is accessed and can be updated, by means of rendering operations that are highly parallel in nature.

A third mode of operation is also provided, for carrying out graphics operations which are not well suited to the class of operations carried out by controller 18. Such operations are best executed by having processor 50 read and write specific pixels in the framebuffer. In this case, addressing means 58 of processor 50 generates an i/o space address, specifying a specific framebuffer pixel (x,y), to be placed on bus 14. Such processor framebuffer address is distinguished as a processor framebuffer read/write address (from framebuffer addresses transmitted as part of atomic graphics operation commands) in any convenient way, for example, by transmission of a read or write instruction. For a write pixel operation, in the next cycle processor 50 places write data signals on bus 14. Interface 12 recognizes the i/o address as specifying a high priority memory module operation, and deasserts GRANT. Memory module addressing means 17 responds to the processor i/o address by providing an address expressed as a location address (specifying update array origin) transmitted at 27 to memory bank 20, and mask information signals (specifying offset within the array) transmitted at 92 to demultiplexers 106 of controller 18.

In a processor write to the framebuffer, write data signals are transmitted on module bus 16. As controlled by state machines 100, controller 18 accesses in parallel all pixels in the identified update array specified by the location address; the multiplexers 106, responsive to mask information input at 92, multiplex the write data signals into the particular location specified by the offset. Processor 50 may read a selected pixel in a similar manner.

From this description it is evident that in all modes of operation controller 18 always accesses in parallel an array of storage locations in memory 20 specified by a location address relative to chip origin, even in cases (as when processor 50 reads or writes one pixel) where fewer than all the locations are of interest.

Data to be stored in system memory is desirably ECC protected, whereas framebuffer data is generally not so protected. In the described embodiment, a $(A=5\times B=4)$ chip array is therefore particularly convenient for flexible partitioning between system memory and framebuffer memory, as four 4-byte words each with a byte of ECC data fit exactly into the chip array, while a $(W=5\times H=4)$ update array is conveniently supported by the same chip array. However, other chip array dimensions may be appropriate in particular implementations, in which write and ECC data are formatted differently.

The memory architecture of the present invention is particularly advantageous for a data processing system which is commercially provided in a number of configurations, as the simplest system need have only a single memory board, providing both system and framebuffer memory. Such a system is relatively economical for the graphics performance which is obtained. As additional memory is added to the system, no hardware change is required to reallocate the memory of the original memory board to be entirely dedicated to framebuffer memory, if desired. Reallocation of memory upon application changes is also made easy by the present invention.

What is claimed is:

1. A data processing system, comprising:

a data processing unit;

a memory module, including an array of K simultaneously accessible memory elements, each memory element storing a multiplicity of data values at specified address locations within a predefined address space, said predefined address space being divided into two portions including a graphics address space and a system memory address space, wherein K is an integer having a value of at least four;

partition means, coupled to said data processing means, for storing a boundary address value between said graphics address space and said system memory address space; and a graphics subsystem, coupled to said data processing unit; said graphics subsystem including a set of K parallel graphics processors, coupled to said data processing means and said memory module, for storing and updating pixel values specifying pixels (x,y) of an X×Y raster framebuffer in said graphics address space of said memory module, said set of K parallel graphics processors coupled to said K memory elements for concurrently accessing and updating an update array of K pixel values, said framebuffer being sequentially addressable as a plurality of update arrays which tile the framebuffer, including a plurality of horizontal rows of update arrays forming an array of said update arrays; and system memory access means for reading and storing data in specified address locations in said system memory address space of said memory module and for transmitting said read and stored data to and from said data processing unit;

wherein each of said K memory elements stores a multiplicity of data values at locations in said graphics address space and a multiplicity of data values in locations in said system memory address space.

2. A data processing system as set forth in claim 1, said data processing unit including means for sending commands to said graphics subsystem, said commands including system memory access commands and graphics commands;

said graphics subsystem further comprising interface means, coupled to said data processing unit, said graphics processors and said system memory access means, for receiving commands from said data processing unit, transferring graphics commands to said graphics subsystem, and transferring system memory access commands to said system memory access means.

3. A data processing system as set forth in claim 1, said graphics address space and said system memory space having address space sizes defined by said boundary address value stored in said partition means; said data processing unit including means for changing said boundary address value stored in said partition means and thereby changing said address space sizes of said graphics address space and said system memory address space.

* * * * *